Aug. 17, 1937.   A. E. NORTHUP   2,090,009
VEHICLE BODY CONSTRUCTION
Filed July 10, 1933
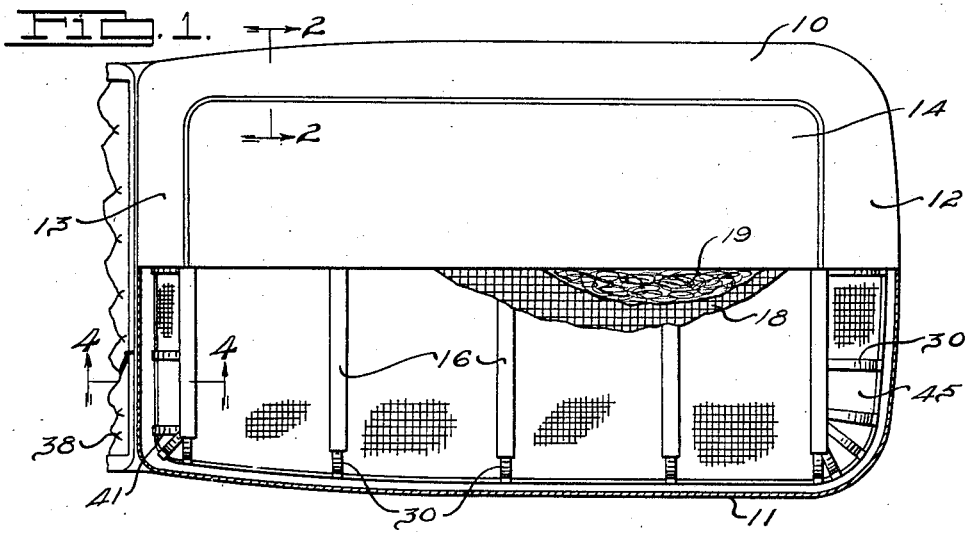
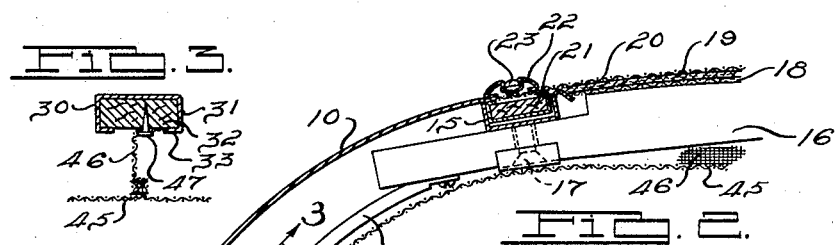
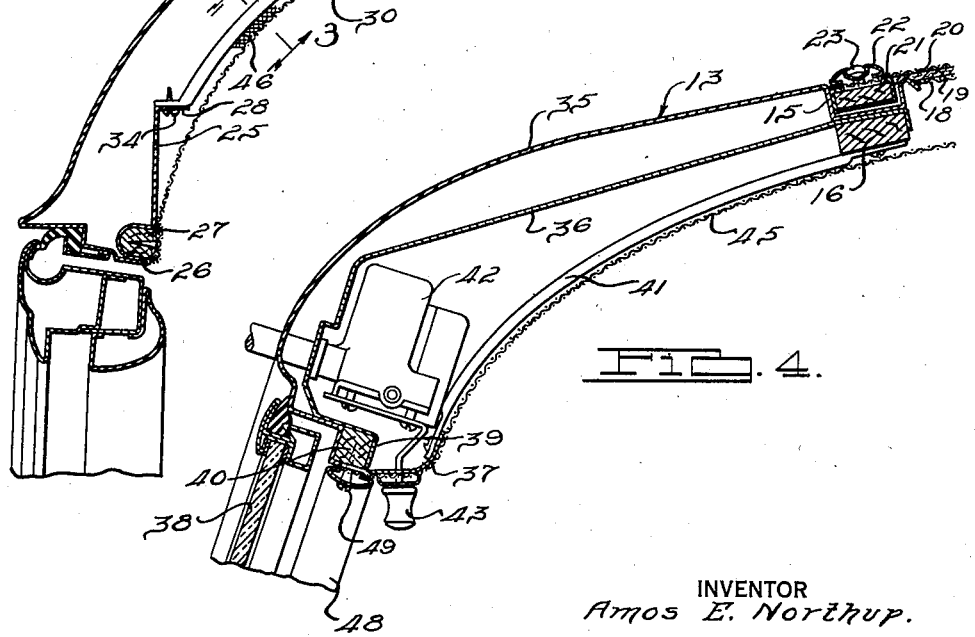
INVENTOR
Amos E. Northup.
BY
Harness, Dickey, Pierce & Hann.
ATTORNEYS.

Patented Aug. 17, 1937

2,090,009

UNITED STATES PATENT OFFICE 2,090,009

VEHICLE BODY CONSTRUCTION

Amos E. Northup, Pleasant Ridge, Mich., assignor to The Murray Corporation of America, a corporation of Delaware Application July 10, 1933, Serial No. 679,613

2 Claims. (Cl. 296—137)

The invention relates to vehicles and it has particular relation to a vehicle body construction.

In automobile bodies at the present time, it is usual to have side quarter panels at the upper edges of the sides of the body, a quarter panel at the rear of the body, and a header panel at the front which is above the windshield. These quarter panels and header define an opening for receiving an insertable roof. After disposing the roof in position, it is usual to fasten a head lining to the lower side of the roof and to extend this lining horizontally under the quarter panels and header.

One object of the present invention is to provide a body construction wherein the head lining is coped downwardly and under the quarter panels and header, so as to improve the appearance of the interior of the body.

Another object of the invention is to provide an economical structure for coping the edge portions of the head lining under the quarter panels and header in the manner mentioned.

Still another advantage of the present invention resides in the fact that in the improved construction disclosed herein, the roof rail is provided with a channel adapted to receive a tacking strip. This roof rail mates with the marginal edge of the roof panel in such a manner that a flange at the marginal edge of the roof panel mates with one wall of the channel constituting the recess for receiving the tacking strip. This construction has been found particularly advantageous because easy and convenient access may be had to these mating flanges in order to weld the same together by inserting one electrode into the channel and the other electrode against the exposed surface of the flange on the roof panel.

Other objects of the invention will become apparent from the following description, the drawing to which it relates, and the claims hereinafter set forth.

For a better understanding of the invention, reference may be had to the drawing, wherein:

Figure 1 is a fragmentary plan view of a vehicle body, partly in cross section to illustrate particularly the structure provided for coping the head lining.

Fig. 2 is a cross-sectional view on a larger scale, taken substantially along the line 2—2 of Fig. 1.

Fig. 3 is a cross-sectional view on a larger scale taken substantially along the line 3—3 of Fig. 2.

Fig. 4 is a cross-sectional view on a larger scale, taken substantially along the line 4—4 of Fig. 1.

Referring to Fig. 1, the body illustrated includes side quarter panels 10 and 11, a rear quarter panel 12 and a front header 13, and these parts of the body define an opening for an insertable roof 14. Each of the side and rear quarter panels 10 and 11, as shown by Fig. 2 in connection with one of the side panels, terminates at its edge defining the opening for the roof 14, in a rabbet 15. The roof comprises cross bows 16 extending under the rabbets 15 on the side quarter panels, and bolts 17 project through the base portion of the rabbets and through the cross bows for rigidly securing the latter in position. A wire screen or layer of fabric 18 is disposed over the upper sides of the cross bows 16, for supporting cotton batting 19 or the like, and over the batting, a waterproof fabric 20 is provided which extends over the rabbets 15. This fabric is fastened to a tacking strip 21 disposed in the rabbet, by means of molding 22 through which tacks 23 project into the tacking strip. The tacks 23 ordinarily are disposed in a groove in the molding and after so fastening the fabric to the tacking strip, a strip of rubber is inserted in the groove to conceal the tacks.

Each of the side and rear quarter panels at its lower edge and at the inner side thereof, terminates in an upwardly directed side rail 25 having a groove 26 at its lower edge which receives and retains a tacking strip 27. This rail at its upper edge terminates in an inwardly directed and substantially horizontal flange 28. In transverse alignment with each of the cross bows 16, a channel strip 30 of downwardly bowed character, extends between the end of the cross bow and the flange 28 of the side rail 25, and as best shown by Fig. 3, tacking material 32 is retained within the channel by lips 33 on the legs of the channel. At its ends, each channel strip 30 is flattened or the legs of the channel may be removed, to leave projecting base portions of the channel, and such portions are secured to the end of the cross bow and to the flange 28 of the side rail by screws 34. It will be understood that the channel strips 30 are so disposed that the space between the lips 33 is exposed downwardly for allowing tacks to be driven into the tacking material 32 from the under side.

Under the rear panel 12, similar channel strips 30 extend between the rear cross bow and a similar side rail forming a part of the rear quarter panel construction. Several of these strips are provided in spaced relation under the rear quarter panel, and at the ends thereof and at the junction of the rear quarter panel with the side quarter panels, several strips are disposed in positions substantially radial to the curved junctions of the panels, so as to provide proper tacking strips around and under the curved corners of the shell construction.

As best shown by Fig. 4, the header includes a finish panel 35 and what is known as a header panel 36 under the finish panel. The header panel 36 at its lower edge is provided with an upwardly directed and arcuate flange 37 and adjacent the windshield indicated at 38, the finish panel and the header panel are shaped to provide a channel 39 which retains tacking material 40. Between the flange 37 and the front cross bow 16, channel strips 41 are provided and these are substantially identical to the channel strips 30 except that they are of greater length. The header panel forms a housing for the usual windshield wiper mechanism 42 which includes an operating element 43 that projects through the flange 37 to the interior of the vehicle.

The head liner is indicated at 45 and for securing it to the cross bows 16 and to the various tacking strips 30 and 41, narrow strips of fabric 46 are sewn to the upper side of the lining as shown particularly by Fig. 3, and each of these strips is adapted to be secured to the cross bows and to the tacking strips by means of tacks indicated at 47. At the lower edge of the side rails 25, as shown by Fig. 2, the edge of the lining is tacked to the strip 27 by means of tacks and similarly the lining is tacked to the strip 40 under the header panel. It will be noted that the tacking strip 40 under the header panel extends adjacent the upper edge of the windshield 38, and for concealing the edge of the lining and the tacks, a metal finishing strip 48 also is secured to the strip 40 by means of suitable screws 49.

It is evident that from all edges of the insertable roof, the head lining 45 is coped downwardly in a neatly appearing and arcuate manner, and this considerably enhances the appearance of the interior of the vehicle body. It is evident also that this coping is obtained in an economical and efficient manner by the use of tacking strips that may be economically manufactured and associated with the cross bows and panel structure.

Although only one form of the invention has been illustrated and described in detail, it will be apparent to those skilled in the art that various modifications may be made without departing from the scope of the appended claims.

I claim:

1. In a vehicle body construction, a roof panel preformed in its marginal edge to provide a door jamb and an inwardly projecting flange inwardly of said door jamb, a roof rail for reinforcing said roof panel, said roof rail being preformed to provide an inwardly presenting channel, one wall of said channel mating with and secured to said inwardly projecting flange by welding through said mating portions, said channel serving to receive a welding electrode during such welding operation.

2. In a vehicle body construction, a roof panel bent inwardly to form a door jamb, a roof rail having a channel therein for receiving a tacking strip, one wall of said channel mating with the marginal edge of said panel, said members being secured together by welding through such mating portions, said channel serving to receive a welding electrode during such welding operation.

AMOS E. NORTHUP.